United States Patent
Kusafuka

(10) Patent No.: US 11,287,650 B2
(45) Date of Patent: Mar. 29, 2022

(54) HEAD-UP DISPLAY AND MOBILE OBJECT COMPRISING HEAD-UP DISPLAY INCLUDING A DISPLAY PANEL, A BARRIER, AND AN OPTICAL SYSTEM CONFIGURED TO FOCUS IMAGE LIGHT CORRESPONDING TO A PARALLAX IMAGE

(71) Applicant: KYOCERA Corporation, Kyoto (JP)

(72) Inventor: Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/971,237

(22) PCT Filed: Feb. 18, 2019

(86) PCT No.: PCT/JP2019/005880
§ 371 (c)(1),
(2) Date: Aug. 19, 2020

(87) PCT Pub. No.: WO2019/163717
PCT Pub. Date: Aug. 29, 2019

(65) Prior Publication Data
US 2021/0080717 A1    Mar. 18, 2021

(30) Foreign Application Priority Data

Feb. 20, 2018  (JP) .............................. JP2018-028248

(51) Int. Cl.
*G09G 5/00* (2006.01)
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1523* (2019.05);
(Continued)

(58) Field of Classification Search
CPC ................ G02B 27/0101; B60K 35/00; B60K 2370/1523; B60K 2370/334
(Continued)

(56) References Cited

U.S. PATENT DOCUMENTS

| 2011/0001803 A1 | 1/2011 | De Zwart et al. |
| 2012/0162761 A1* | 6/2012 | Grasnick .............. H04N 13/317 359/462 |

(Continued)

FOREIGN PATENT DOCUMENTS

| JP | H07-287196 A | 10/1995 |
| JP | 2005-003918 A | 1/2005 |
| JP | 2016-048344 A | 4/2016 |

*Primary Examiner* — Jonathan M Blancha
(74) *Attorney, Agent, or Firm* — Studebaker & Brackett PC

(57) ABSTRACT

A head-up display includes: a display panel emitting image light corresponding to a parallax image including a left-eye image and a right-eye image; a barrier including barrier patterns allowing the image light corresponding to the left-eye image and the right-eye image to reach user's left and right eyes, respectively; and an optical system carrying out focusing of the image light corresponding to the parallax image and projecting a resulting parallax image to user's left and right eyes. The optical system carries out focusing of the image light corresponding to the parallax image on a projection plane so that the parallax image is enlarged in a first direction corresponding with a parallax direction by a first enlargement factor, and the parallax image is enlarged in a second direction intersecting with the first direction by a second enlargement factor. The first and second enlargement factors are different from each other.

10 Claims, 6 Drawing Sheets

(52) U.S. Cl.
CPC .............. *B60K 2370/334* (2019.05); *G02B 2027/0129* (2013.01); *G02B 2027/0136* (2013.01)

(58) Field of Classification Search
USPC .......................................... 345/7
See application file for complete search history.

(56) References Cited

U.S. PATENT DOCUMENTS

| | | | |
|---|---|---|---|
| 2016/0173867 A1* | 6/2016 | Ichihashi | H04N 13/31 348/54 |
| 2017/0184869 A1 | 6/2017 | Choi et al. | |
| 2018/0031837 A1* | 2/2018 | Fan-Chiang | G02B 27/0172 |
| 2018/0139437 A1* | 5/2018 | Hwang | H04N 13/31 |

* cited by examiner

HEAD-UP DISPLAY AND MOBILE OBJECT COMPRISING HEAD-UP DISPLAY INCLUDING A DISPLAY PANEL, A BARRIER, AND AN OPTICAL SYSTEM CONFIGURED TO FOCUS IMAGE LIGHT CORRESPONDING TO A PARALLAX IMAGE

CROSS-REFERENCE TO RELATED APPLICATION

This application is a national stage entry according to 35 U.S.C. 371 of International Application No. PCT/JP2019/005880 filed on Feb. 18, 2019, which claims priority to Japanese Patent Application No. 2018-028248 filed on Feb. 20, 2018, the disclosures of which are entirely incorporated herein by reference.

TECHNICAL FIELD

The present disclosure relates to a head-up display and a mobile object.

BACKGROUND

There is a heretofore known display device which includes a barrier to block at least part of image light for projection of a parallax image to user's eyes to provide stereoscopic vision. The technology underlying the device is described in Japanese Unexamined Patent Publication JP-A 7-287196 (1995), for example.

SUMMARY

A head-up display in accordance with an embodiment of the disclosure includes a display panel, a barrier, and an optical system. The display panel is configured to emit image light corresponding to a parallax image including a left-eye image and a right-eye image. The barrier includes barrier patterns which can operate to allow image light corresponding to the left-eye image to reach user's left eye, as well as to allow image light corresponding to the right-eye image to reach user's right eye. The optical system is configured to carry out focusing of the image light corresponding to the parallax image and project a resulting parallax image to user's left and right eyes. The optical system is configured to carry out focusing of the image light corresponding to the parallax image on a projection plane so that the parallax image is enlarged in a first direction corresponding with a parallax direction by a first enlargement factor, and the parallax image is enlarged in a second direction intersecting with the first direction by a second enlargement factor. The first enlargement factor and the second enlargement factor differ from each other.

A mobile object in accordance with an embodiment of the disclosure incorporates a head-up display. The head-up display includes a display panel, a barrier, and an optical system. The display panel is configured to emit image light corresponding to a parallax image comprising a left-eye image and a right-eye image. The barrier includes barrier patterns which can operate to allow image light corresponding to the left-eye image to reach user's left eye, as well as to allow image light corresponding to the right-eye image to reach user's right eye. The optical system is configured to carry out focusing of the image light corresponding to the parallax image and project of a resulting parallax image to user's left and right eyes. The optical system is configured to carry out focusing of the image light corresponding to the parallax image on a projection plane so that the parallax image is enlarged in a first direction corresponding with a parallax direction by a first enlargement factor, and the parallax image is enlarged in a second direction intersecting with the first direction by a second enlargement factor. The first enlargement factor and the second enlargement factor differ from each other.

DETAILED DESCRIPTION

There are demands for providing users with stereoscopic vision based on a laterally elongated image.

Figure 1:
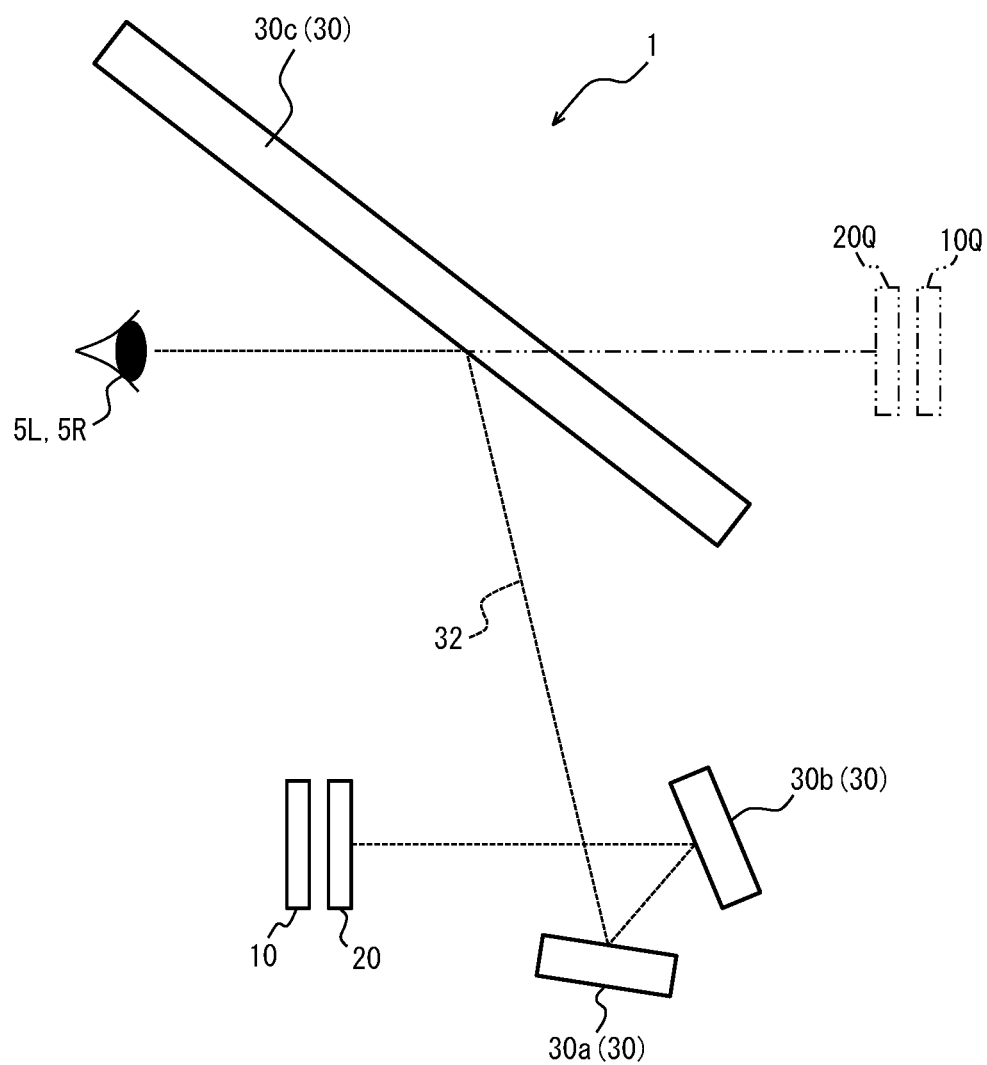
FIG. 1 is a view showing a constructional example of a head-up display according to one embodiment.

As shown in FIG. 1, a head-up display 1 according to an embodiment of the invention includes a display device 10, a barrier 20, and an optical system 30. The head-up display 1 is also referred to as "HUD" (Head Up Display). In the head-up display 1, the display device 10 displays an image, and the barrier 20 blocks part of image light, so that different images can be projected to left and right eyes 5L and 5R of the user. That is, the head-up display 1 allows user's eyes to be subjected to projection of different portions of a parallax image. It can be said that the parallax image is projected onto projection planes positioned in correspondence with user's eyes. On viewing the different portions of the parallax image with left eye 5L and right eye 5R of the user, respectively, the user can see a stereoscopic image. The parallax image includes a left-eye image to be projected to the left eye 5L of the user, and a right-eye image to be projected to the right eye 5R of the user.

The display device 10 is configured to display the left-eye image and the right-eye image. That is, the display device 10 is configured to emit image light corresponding to the left-eye image and image light corresponding to the right-eye image. A plane for emission of the image light corresponding to the left-eye image, as well as the image light corresponding to the right-eye image, in the display device 10 is also referred to as "display plane". For example, the display device 10 may include a liquid crystal device such as a LCD (Liquid Crystal Display). The display device 10 may include a backlight and a liquid crystal panel. The display device 10 may include a self-luminous device such as an organic EL (Electro-Luminescence) display or an inorganic EL display. The display device 10 is also referred to as "display panel".

The barrier 20 may be located between the display device 10 and the left and right eyes 5L and 5R of the user. In the case where the display device 10 includes a liquid crystal device, the barrier 20 may be located between the backlight and the liquid crystal panel. The barrier 20, while allowing the image light corresponding to the right-eye image to reach the right eye 5R of the user, restrains the image light from reaching the left eye 5L of the user. Moreover, the barrier 20, while allowing the image light corresponding to the left-eye image to reach the left eye 5L of the user, restrains the image light from reaching the right eye 5R of the user.

The optical system 30 is located in an optical path 32 over which image light emitted from the display device 10 travels to the left and right eyes 5L and 5R of the user. The optical system 30 is configured to carry out focusing of image light and project a resulting parallax image to user's eyes. The optical system 30 may form a parallax image while rescaling the image. The optical system 30 may include an optical member 30a, an optical member 30b, and an optical member 30c. The number of the optical members constituting the optical system 30 is not limited to three, and thus two or less, or four or more optical members may be provided. The optical member may include a reflective member including a convex mirror or a concave mirror. The optical member may include a refractive member including a convex lens or a concave lens. Examples of the convex lens include a biconvex lens, a planoconvex lens, and a convex meniscus lens. Examples of the concave lens include a biconcave lens, a planoconcave lens, and a concave meniscus lens. The optical member is not limited to the reflective member and the refractive member, and may thus include other different optical member.

A virtual image 10Q from the display device 10 and a virtual image 20Q from the barrier 20 are located on a line extended depth-wise from the nearest optical member 30c in a user's sight as indicated by alternate long and short dashed lines. The virtual image 10Q and the virtual image 20Q can be projected as a parallax image to user's eyes. That is, the user can visually recognize the virtual image 10Q and the virtual image 20Q as a parallax image. Thus, stereoscopic vision can be provided for the user.

Figure 2:
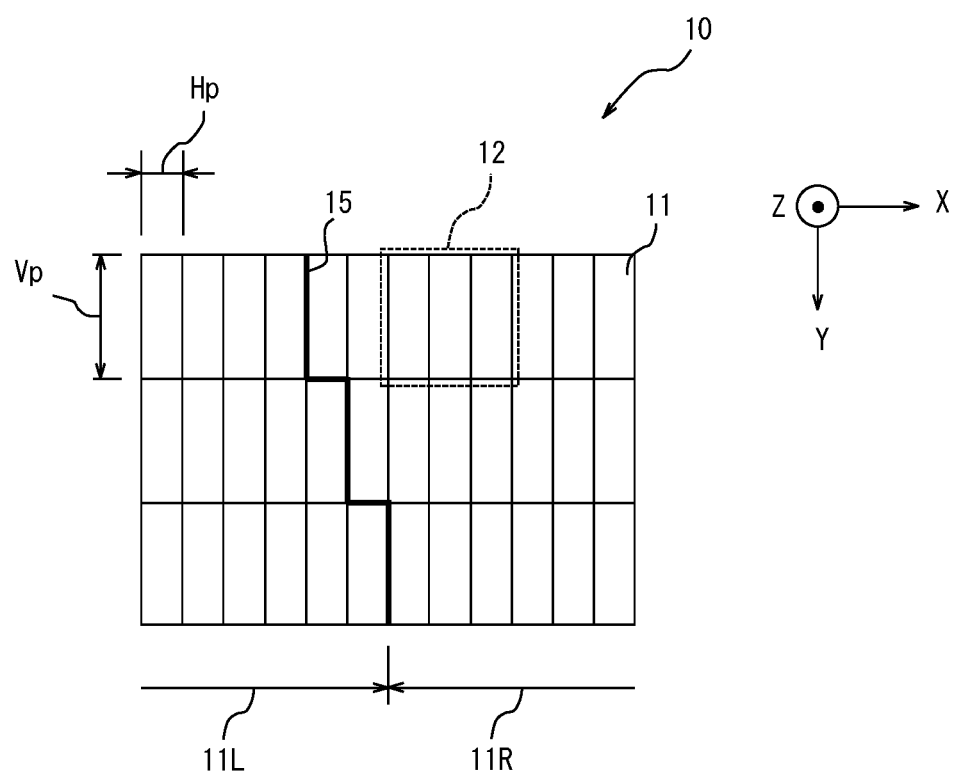
FIG. 2 is a view showing an example of arrangement of pixels in a display device.

As shown in FIG. 2, the display device 10 includes subpixels 11. The subpixels 11 may be arranged in grid form. In this embodiment, the grid axes defining the matrix of the subpixels 11 are assumed to be an X axis and a Y axis. The subpixels 11 may be arranged in an X-axis direction as well as in a Y-axis direction at a certain pitch. The pitch of the subpixel arrangement in the X-axis direction is designated by Hp, and the pitch of the subpixel arrangement in the Y-axis direction is designated by Vp. In what follows, the pitch Vp is assumed to be greater than the pitch Hp.

A direction in which binocular parallax is provided to user's eyes is also referred to as "parallax direction". The parallax direction corresponds with the direction in which user's left eye 5L and right eye 5R are arranged. In this embodiment, the X-axis direction is assumed to correspond with the parallax direction. The X-axis direction is also referred to as "horizontal direction" or "first direction". The Y-axis direction is also referred to as "vertical direction" or "second direction". The first direction corresponds with the parallax direction. The second direction intersects with the first direction.

The subpixels 11 may constitute a pixel 12. The pixel 12 may include three subpixels 11 enclosed within dash outlines in the drawing. For example, the pixel 12 may include subpixels 11 representing different colors, namely R, G, and B. The number of the subpixels 11 contained in the pixel 12 is not limited to three, and thus, one or two subpixels 11, or four or more subpixels 11 may be contained in the pixel 12. In the case where the display device 10 is built as a LCD, or an organic or inorganic EL display, each of its pixels may correspond to the subpixel 11 or the pixel 12. In this embodiment, the pixel 12 is assumed to include the subpixels 11 aligned in the parallax direction. In other words, subpixels 11 constituting the pixel 12 are arranged side by side in a user's sight. In this case, the X-axis direction corresponds with the direction of the side-by-side arrangement, i.e. the lateral direction, and the Y-axis direction corresponds with the longitudinal direction. The ratio between the longitudinal length of the subpixel 11 and the lateral length of the subpixel 11 in a user's sight is also referred to as "aspect ratio of the subpixel 11". In this case, the aspect ratio is expressed as: Vp/Hp. The aspect ratio Vp/Hp will hereinafter be designated by x. In this case, the value of x is greater than 1.

The matrix of the subpixels 11 may be divided by a display boundary 15 in stepped configuration indicated by a heavy line. The position and the configuration of the display boundary 15 may be determined by the display device 10. The configuration of the display boundary 15 is not limited to that shown in FIG. 2, and thus the display boundary 15 may have other configuration. The matrix of the subpixels 11 is divided by the display boundary 15 into a first region 11L and a second region 11R. Each subpixel 11 located in the first region 11L is also referred to as "first subpixel", and each subpixel 11 located in the second region 11R is also referred to as "second subpixel". The display device 10 may enable the first region 11L to display the left-eye image, and enable the second region 11R to display the right-eye image. In this case, the first subpixel displays the left-eye image, and the second subpixel displays the right-eye image. The display boundary 15 may include a first display boundary indicating the range of the first region 11L and a second display boundary indicating the range of the second region 11R. This allows representation of subpixels 11 that are contained in neither of the first region 11L and the second region 11R.

Figure 3:
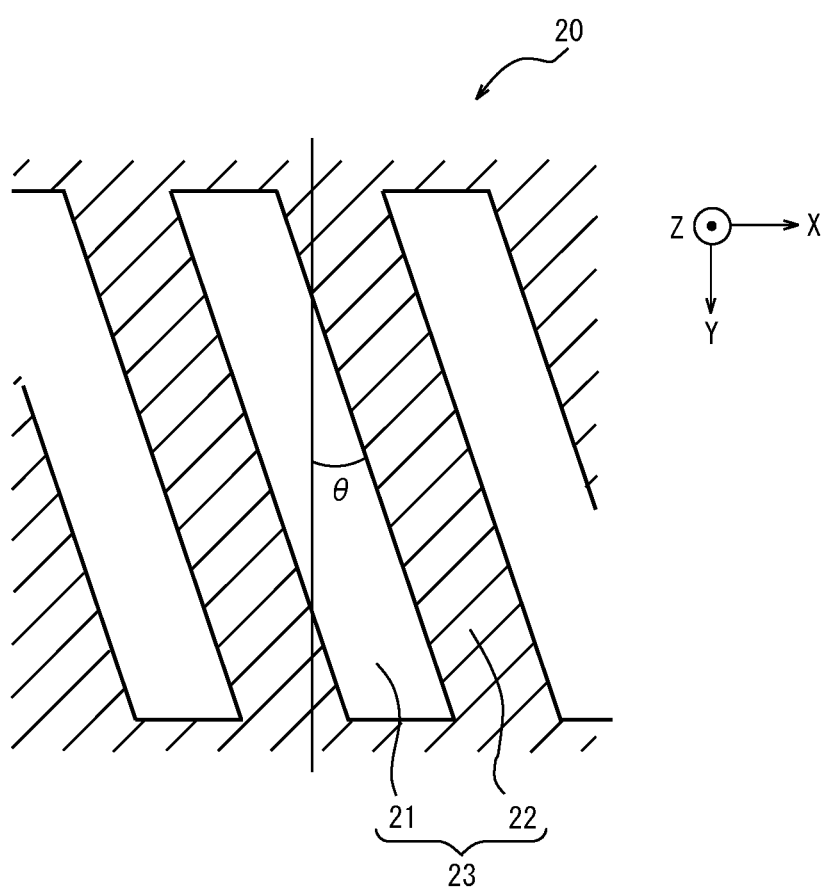
FIG. 3 is a view showing a constructional example of a barrier.

As shown in FIG. 3, the barrier 20 includes a light-transmitting region 21 and a light-diminishing region 22. The light-transmitting region 21 allows light incident on the barrier 20 to pass therethrough. The light-transmitting region 21 permits transmission of light at a transmittance which is greater than or equal to a first certain value. For example, the first certain value is set at 100%, or a value close to 100%. The light-diminishing region 22 diminishes light incident on the barrier 20. The light-diminishing region 22 permits transmission of light at a transmittance which is less than or equal to a second certain value. For example, the second certain value is set at 0%, or a value close to 0%. The first certain value need only be a value that ensures a sufficient degree of contrast with the light transmitted through the light-diminishing region 22, and may thus be less than 50%, for example, 10%. The second certain value need only be a value that ensures a sufficient degree of contrast with the light transmitted through the light-transmitting region 21, and may thus be greater than the value close to 0%, for example, 10%. For example, a satisfactory contrast ratio can be set at 100:1.

The light-transmitting regions 21 and the light-diminishing regions 22 are alternately arranged in the X-axis direction. A pair of the light-transmitting region 21 and the light-diminishing region 22 is also referred to as "barrier pattern 23". It can be said that the barrier pattern 23 can operate to allow the image light corresponding to the left-eye image to reach the left eye 5L of the user, as well as to allow the image light corresponding to the right-eye image to reach the right eye 5R of the user. It can also be said that the barrier patterns 23 are arranged in the parallax direction at a certain pitch. The borderline between the light-transmitting region 21 and the light-diminishing region 22 extends in a direction inclined at a certain angle designated by θ with respect to the Y-axis direction. That is, the barrier pattern 23 extends in a direction inclined at a certain angle designated by θ with respect to the Y-axis direction. A line representing an end of the light-transmitting region 21 is also referred to as "end line of the light-transmitting region 21". The certain angle θ is also referred to as "barrier inclination angle". The angle θ may be greater than 0 degree, and less than 90 degrees. The angle θ may be less than 45 degrees.

By way of comparative example, if the end line of the light-transmitting region 21 extends in the direction of arrangement of the subpixels 11 as exemplified in FIG. 2 (the Y-axis direction), the displayed image is likely to show signs of moire due to errors associated with the arrangement of the subpixels 11 or the dimensions of the light-transmitting region 21. On the other hand, where the end line of the light-transmitting region 21 extends in a direction inclined at a certain angle with respect to the direction of arrangement of the subpixels 11 (the Y-axis direction), the displayed image is less likely to show signs of moire regardless of the presence of errors associated with the arrangement of the subpixels 11 or the dimensions of the light-transmitting region 21.

The barrier 20 may be constituted by a film or sheet member having a transmittance which is less than the second certain value. In this case, the light-diminishing region 22 is constituted by the film or the sheet member. The light-transmitting region 21 is constituted by an opening formed in the film or the sheet member. The film may be made of resin or other material. The sheet member may be made of resin or metal, or other material. The barrier 20 is not limited to the film and the sheet member, and may thus be constituted by another member of different type. The barrier 20 may be made of a light-shielding base material. The barrier 20 may be made of a base material containing a light-shielding adjunct.

The barrier 20 may be constituted by a liquid crystal shutter. The liquid crystal shutter is capable of controlling the transmittance of light according to an applied voltage. The liquid crystal shutter, which includes pixels, may control the transmittance of light in each of the pixels. In the liquid crystal shutter, a region of high light transmittance or a region of low light transmittance can be formed in any given shape. In the case where the barrier 20 is constituted by a liquid crystal shutter, the light-transmitting region 21 may be a region having a light transmittance which is greater than or equal to the first certain value. Moreover, in the case where the barrier 20 is constituted by a liquid crystal shutter, the light-diminishing region 22 may be a region having a light transmittance which is less than or equal to the second certain value.

The light-transmitting region 21 allows the image light corresponding to the left-eye image to pass therethrough so that the image light corresponding to the left-eye image can reach the left eye 5L of the user. Moreover, the light-transmitting region 21 allows the image light corresponding to the right-eye image to pass therethrough so that the image light corresponding to the right-eye image can reach the right eye 5R of the user. The light-diminishing region 22 diminishes the image light corresponding to the left-eye image to restrain the image light corresponding to the left-eye image from reaching the right eye 5R of the user, or to obscure the image light corresponding to the left-eye image from the right eye 5R's view. Moreover, the light-diminishing region 22 diminishes the image light corresponding to the right-eye image to restrain the image light corresponding to the right-eye image from reaching the left eye 5L of the user, or to obscure the image light corresponding to the right-eye image from the left eye 5L's view. That is, the barrier 20 enables projection of the left-eye image to the corresponding left eye 5L of the user, as well as projection of the right-eye image to the corresponding right eye 5R of the user. Note that the left-eye image is not projected or projected in greatly dimmed condition to the non-corresponding right eye 5R of the user, and the right-eye image is not projected or projected in greatly dimmed condition to the non-corresponding left eye 5L of the user. The barrier 20 may be spaced by a certain distance away from the display device 10. In the case where the display device 10 is constituted by a liquid crystal device, the barrier 20 may be spaced by a certain distance away from a liquid crystal panel of the display device.

Figure 4:
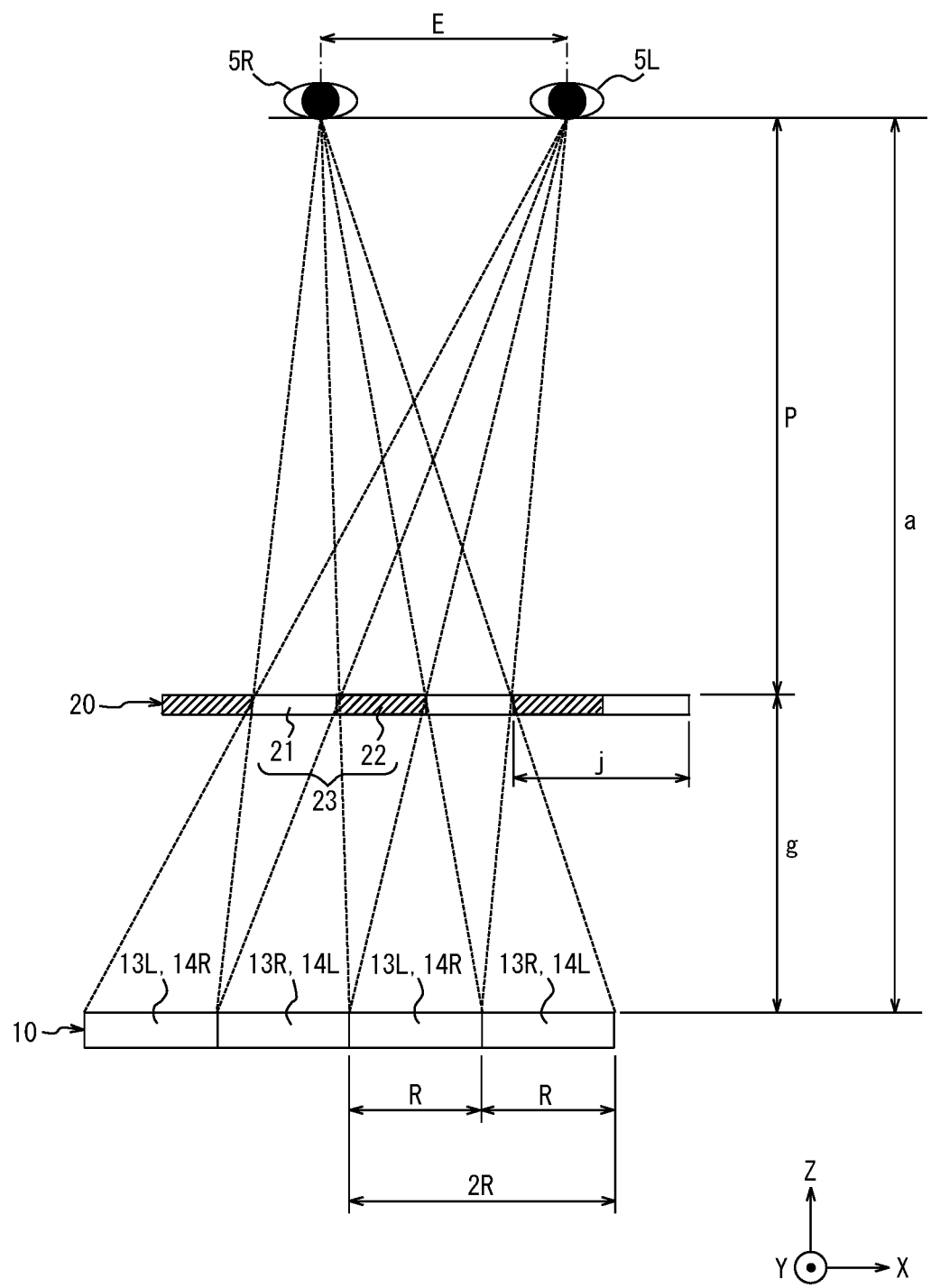
FIG. 4 is a view showing a constructional example of the barrier for a case where a parallax image is projected to user's eyes without using an optical system.

As shown in FIG. 4, user's left eye 5L and right eye 5R are assumed to be spaced by a distance designated by P away from the barrier 20. In the case where the optical system 30 is located between the user and the barrier 20, the distance P may be equal to the length of the optical path 32 extending from the barrier 20 to user's left eye 5L and right eye 5R, or may be a value obtained by correcting the length of the optical path 32 on the basis of the characteristics of the optical system 30. The barrier patterns 23 each including the light-transmitting region 21 and the light-diminishing region 22 are arranged in the X-axis direction at a certain pitch designated by j. The certain pitch of the arrangement of the barrier patterns 23 is also referred to as "barrier pitch". The distance between the left eye 5L and the right eye 5R is also referred to as "interocular distance" designated by E. The distance from the barrier 20 to the display device 10 is also referred to as "gap" designated by g. The distance from user's left eye 5L and right eye 5R to the display device 10 is designated by a.

The display device 10 includes a region 13L which is visible to user's left eye 5L via the light-transmitting region 21, being called "left-eye visible region 13L", and a region 14L which is invisible to user's left eye 5L or obscured from the left eye 5L's view due to the light-diminishing region 22, being called "left-eye dimmed region 14L". The left-eye visible region 13L and the left-eye dimmed region 14L are arranged in alternate order in the X-axis direction. The position of a boundary between the left-eye visible region 13L and the left-eye dimmed region 14L is determined on the basis of the position of the end line of the light-transmitting region 21, the distance (P) from the barrier 20 to user's eyes, and the gap (g).

The display device 10 includes a right-eye visible region 13R which is visible to user's right eye 5R via the light-transmitting region 21, and a right-eye dimmed region 14R which is invisible to user's right eye 5R or obscured from the right eye 5R's view due to the light-diminishing region 22. The right-eye visible region 13R and the right-eye dimmed region 14R are alternately arranged in the X-axis direction. The position of a boundary between the right-eye visible region 13R and the right-eye dimmed region 14R is determined on the basis of the position of the end line of the light-transmitting region 21, the distance (P) from the barrier 20 to user's eyes, and the gap (g).

The display device 10 may be configured so that the left-eye visible region 13L is formed by enabling the subpixels 11 located in the first region 11L (refer to FIG. 2) to display the left-eye image. The display device 10 may be configured so that the right-eye visible region 13R is formed by enabling the subpixels 11 located in the second region 11R (refer to FIG. 2) to display the right-eye image. In the case where the first region 11L and the second region 11R correspond to the left-eye visible region 13L and the right-eye visible region 13R, respectively, the display boundary 15 represents a boundary between the left-eye visible region 13L and the right-eye visible region 13R. That is, in the display device 10, the position of the display boundary 15 may be determined on the basis of the position of the end line of the light-transmitting region 21, the distance (P) from the barrier 20 to user's eyes, and the gap (g).

In the case where the left-eye visible region 13L and the right-eye visible region 13R, at least partly, overlap with each other in the X-axis direction, there may arise crosstalk which is a phenomenon in which part of the left-eye image is projected to the right eye 5R, or part of the right-eye image is projected to the left eye 5L. Crosstalk causes deterioration in the image quality of a parallax image projected to the user.

In the case where the left-eye visible region 13L and the right-eye visible region 13R are alternately arranged with no mutual overlap in the X-axis direction, the left eye 5L recognizes the left-eye image alone, and the right eye 5R recognizes the right-eye image alone, in consequence whereof there may result reduced crosstalk. As long as the left eye 5L recognizes only the left-eye image and the right eye 5R recognizes only the right-eye image, the distance (P) from the barrier 20 to user's eyes can be said to be an ideal viewing distance. The ideal viewing distance is also referred to as "OVD (Optimal Viewing Distance)".

The left-eye visible region 13L and the right-eye visible region 13R are each also referred to as "monocular dot group". The pitch of the arrangement of the monocular dot groups in the X-axis direction is also referred to as "monocular dot group pitch" designated by R. A combination of the left-eye visible region 13L and the right-eye visible region 13R is also referred to as "binocular dot group". The pitch of the arrangement of the binocular dot groups in the X-axis direction is also referred to as "binocular dot group pitch". Given that the distance P is OVD, then the binocular dot group pitch is twice the monocular dot group pitch, and is thus designated by 2R.

The optical system 30 may form a parallax image while rescaling it at various enlargement factors. The optical system 30 may form a parallax image while rescaling it in the first direction by a first enlargement factor. The optical system 30 may form a parallax image while rescaling it in the second direction by a second enlargement factor. The first enlargement factor and the second enlargement factor may differ from each other. The first enlargement factor may be greater than the second enlargement factor. Setting the first enlargement factor and the second enlargement factor at different values may allow easy changing of the aspect ratio of an image in user's sight. Setting the first enlargement factor at a value greater than the second enlargement factor may allow easy increase of the ratio of the lateral length to the longitudinal length in the image.

Figure 5:
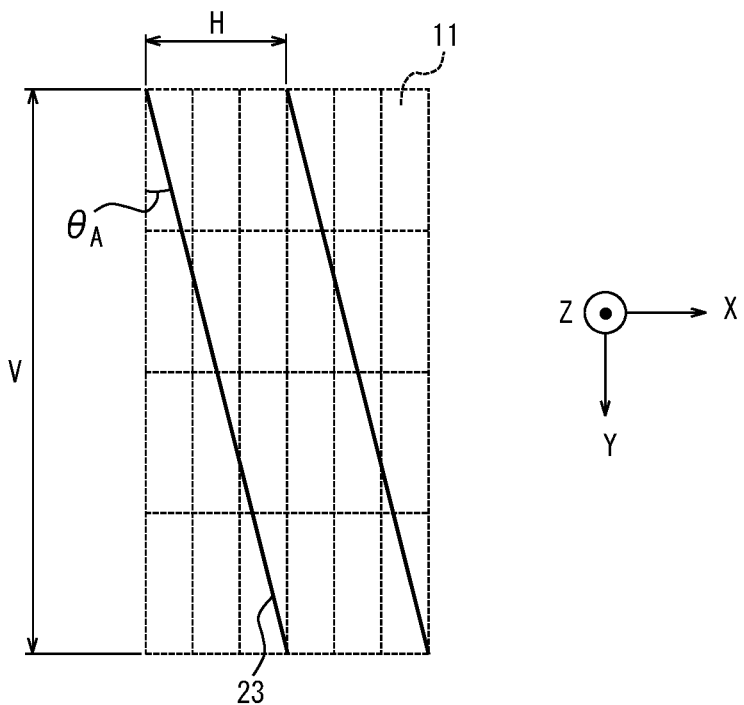
FIG. 5 is a view showing an example of a barrier pattern.

FIG. 5 is a view showing an example of the actual relationship between the subpixel 11 and the barrier pattern 23. As shown in FIG. 5, the barrier pattern 23 extends in a direction inclined at a certain angle with respect to the direction of arrangement of the subpixels 11. The direction in which the barrier pattern 23 extends can be specified as a direction inclined at a certain angle designated by $\theta_A$ with respect to the Y-axis direction. The certain angle at which the barrier pattern 23 is inclined is also referred to as "angle of inclination or inclination angle".

The angle of inclination of the barrier pattern 23 may be determined on the basis of the parallax direction. The angle of inclination of the barrier pattern 23 may be determined so that the angle between the extending direction of the barrier pattern 23 and the parallax direction can become greater than 45 degrees. In this case, the inclination angle corresponds to an angle smaller than 45 degrees. This facilitates provision of binocular parallax to user's eyes. The angle of inclination of the barrier pattern 23 may be determined on the basis of the matrix of the subpixels 11. The angle of inclination of the barrier pattern 23 may be determined so that the frequency of occurrence of crosstalk can be reduced. The angle of inclination of the barrier pattern 23 may exert influence on the quality of stereoscopic vision to be provided for the user. That is, setting the angle of inclination of the barrier pattern 23 at a desired value may improve the quality of stereoscopic vision provided for the user.

In FIG. 5, $\theta_A$ satisfies a relationship given as: $\tan \theta_A = H/V$. That is, the extending direction of the barrier pattern 23 can be expressed as a direction along a straight line extending with inclination which increases by an amount equal to H in the X-axis direction and increases by an amount equal to V in the Y-axis direction in accordance with the X-Y coordinate system. It can be said that the barrier patterns 23 are arranged in the X-axis direction at a certain pitch. The pitch of the arrangement of the barrier patterns 23 in the X-axis direction is also referred to as "first pitch" designated by H. The first pitch may be equal to an integral multiple of the pitch in the X-axis direction of the subpixel 11. The first pitch may be determined so that the length of each of the left-eye visible region 13L and the right-eye visible region 13R in the X-axis direction can become equal to an integral multiple of the pitch in the X-axis direction of the subpixel 11. It can be said that the barrier patterns 23 are arranged in the Y-axis direction at a certain pitch. The pitch of the arrangement of the barrier patterns 23 in the Y-axis direction is also referred to as "second pitch" designated by V. The second pitch may be equal to an integral multiple of the pitch in the Y-axis direction of the subpixel 11. The ratio of the first pitch to the second pitch is also referred to as "barrier pitch aspect ratio" designated by H/V. Given that the relationship given as: $\tan \theta_A = H/V$ is satisfied, if the first pitch changes from H to H×α (wherein α is a positive real number), the second pitch will change from V to V×α. That is, regardless of whether the value of the first pitch is changed or not, the barrier pitch aspect ratio remains at H/V, which is equal to the value of $\tan \theta_A$. It can be said that equality between the barrier pitch aspect ratio and the value of $\tan \theta_A$ is maintained even if the first pitch becomes greater than H, and also becomes smaller than H.

Figure 6:
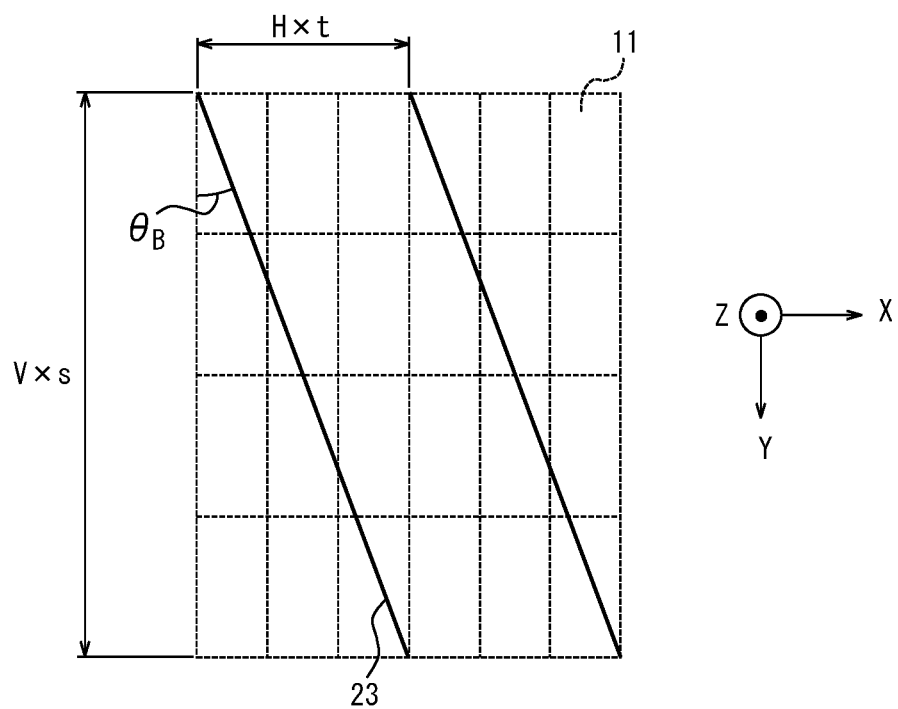
FIG. 6 is a view showing how the barrier pattern shown in FIG. 5 is to be seen through the optical system.

FIG. 6 is a view showing an example of the apparent relationship between the subpixel 11 and the barrier pattern 23. In the optical system 30, assume that the first enlargement factor and the second enlargement factor are designated by t and s, respectively, and that the ratio of the first enlargement factor to the second enlargement factor is designated by w. That is, a relationship given as: w=t/s is satisfied. The value w is assumed to be greater than 1. Each of t, s, and w may be a positive integer, or a positive rational number, or also a positive real number. The barrier pattern 23 and the subpixel 11 appear to be enlarged in the X-axis direction only by the first enlargement factor (t), as well as to be enlarged in the Y-axis direction only by the second enlargement factor (s), when viewed through the optical system 30. The barrier pattern 23 and the subpixel 11 viewed through the optical system 30 are also referred to as "barrier pattern 23 and subpixel 11 projected on a projection plane", or as "apparent barrier pattern 23 and apparent subpixel 11". The barrier pattern 23 and the subpixel 11 viewed without using the optical system 30 are also referred to as "barrier pattern 23 and subpixel 11 displayed on a display plane", or as "actual barrier pattern 23 and actual subpixel 11". As shown in FIG. 6, as compared with the actual barrier pattern 23 and the actual subpixel 11 shown in FIG. 5, the apparent barrier pattern 23 and the apparent subpixel 11 appear to be enlarged in the X-axis direction only by the first enlargement factor (t), as well as to be enlarged in the Y-axis direction only by the second enlargement factor (s). The angle of inclination of the barrier pattern 23 viewed through the optical system 30 is also referred to as "apparent inclination angle". In FIG. 6, the apparent inclination angle ($\theta_B$) satisfies a relationship given as: tan $\theta_B$=(H×t)/(V×s)=H×w/V.

The first pitch and the second pitch viewed through the optical system 30 are also referred to as "apparent first pitch and apparent second pitch". The first pitch and the second pitch viewed without using the optical system 30 are also referred to as "actual first pitch and actual second pitch". As compared with the actual first pitch and the actual second pitch, the apparent first pitch and the apparent second pitch appear to be enlarged on the basis of the first enlargement factor and the second enlargement factor, respectively. The apparent barrier pitch aspect ratio is equal to the value of tan $\theta_B$, and is expressed as: H×w/V. That is, the apparent barrier pitch aspect ratio is w times the actual barrier pitch aspect ratio. Regardless of whether w is greater than 1 or not, the apparent inclination angle is expressed as a value w times the actual inclination angle, and the apparent barrier pitch aspect ratio is expressed as a value w times the actual barrier pitch aspect ratio.

Figure 7:
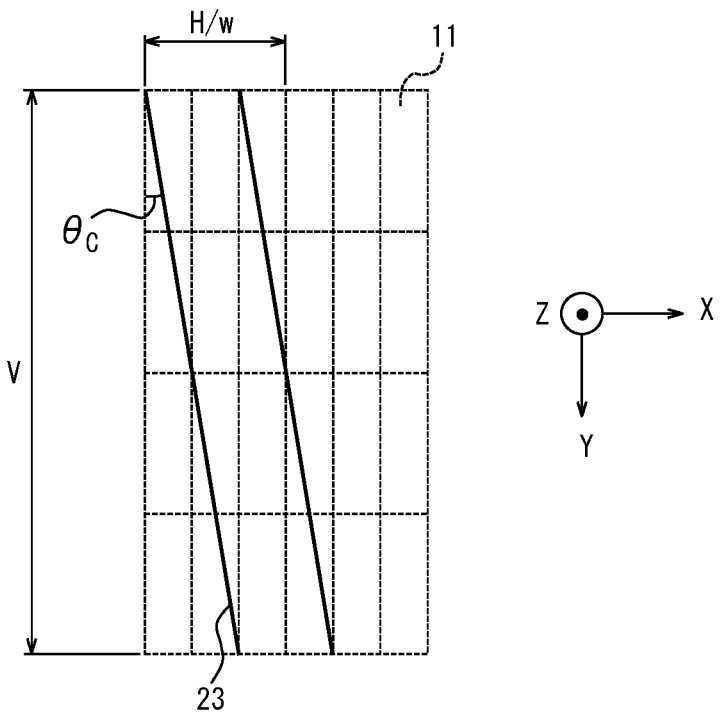
FIG. 7 is a view showing an example of a barrier pattern.

FIG. 7 is a view showing an example of the actual relationship between the subpixel 11 and the barrier pattern 23. The angle of inclination of the barrier pattern 23 shown in FIG. 7 is expressed as $\theta_C$. Here, $\theta_C$ satisfies a relationship given as: tan $\theta_C$=(H/w)/V. That is, the extending direction of the barrier pattern 23 can be defined by a straight line extending with inclination which increases by an amount equal to H/w in the X-axis direction and increases by an amount equal to V in the Y-axis direction in accordance with the X-Y coordinate system. In this case, the barrier pitch aspect ratio in the barrier pattern 23 is expressed as (H/w)/V, which is equal to the value of tan $\theta_C$.

Figure 8:
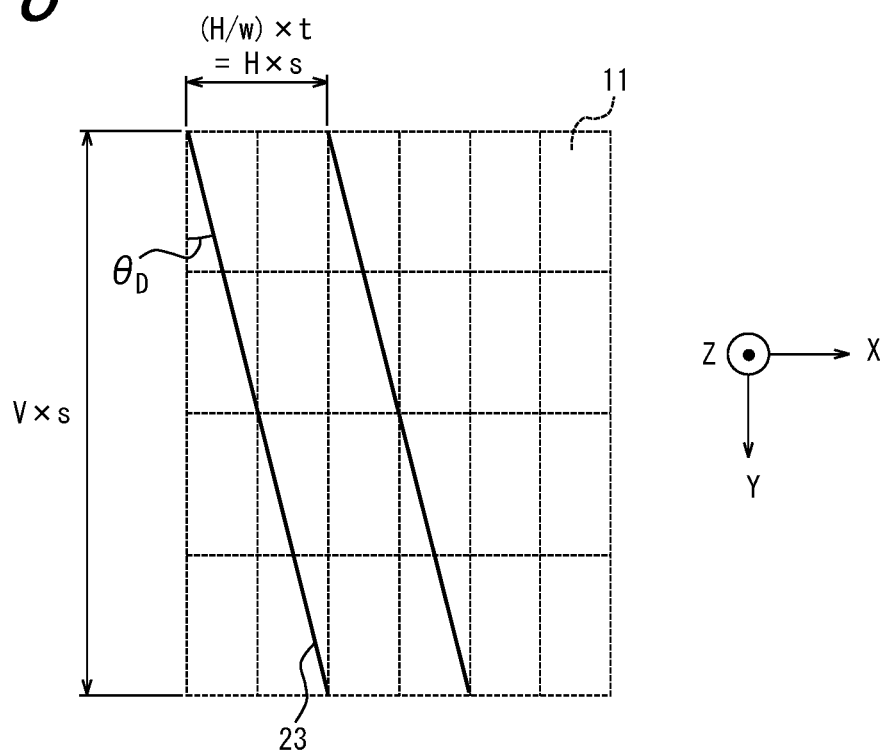
FIG. 8 is a view showing how the barrier pattern shown in FIG. 7 is to be seen through the optical system.

FIG. 8 is a view showing an example of the apparent relationship between the subpixel 11 and the barrier pattern 23. As shown in FIG. 8, as compared with the actual barrier pattern 23 and the actual subpixel 11 shown in FIG. 7, the apparent barrier pattern 23 and the apparent subpixel 11 appear to be enlarged in the X-axis direction only by the first enlargement factor (t), as well as to be enlarged in the Y-axis direction only by the second enlargement factor (s). The apparent inclination angle ($\theta_D$) satisfies a relationship given as: tan $\theta_D$={(H/w)×t}/(V×s)=(H×s)/(V×s)=H/V.

The actual inclination angle ($\theta_C$) shown in FIG. 7 is determined so that the apparent inclination angle ($\theta_D$) shown in FIG. 8 can become equal to the inclination angle ($\theta_A$) shown in FIG. 5. The actual inclination angle may be determined so that the apparent inclination angle can become equal to a desired inclination angle. That is, the actual angle of inclination of the barrier pattern 23 may be determined on the basis of the ratio of the first enlargement factor to the second enlargement factor (w) in the optical system 30. In this case, the apparent angle of inclination of the barrier pattern 23 can be set at a desired inclination angle even if the optical system 30 enlarges an image both in the longitudinal direction and in the lateral direction by different enlargement factors.

The angle of inclination of the barrier pattern 23 may exert influence on the quality of stereoscopic vision to be provided for the user. For example, if the apparent inclination angle exceeds 45 degrees, the user may find it hard to have satisfactory stereoscopic vision. In the head-up display 1 according to the embodiment, while a parallax image is being enlarged in the lateral direction, the apparent angle of inclination of the barrier pattern 23 can be set at a desired angle. This may improve the quality of laterally enlarged stereoscopic vision.

Based on the fact that the value of the tangent of the inclination angle (tan) and the barrier pitch aspect ratio are equal, when the apparent inclination angle is set at a desired inclination angle, the apparent barrier pitch aspect ratio is set at a desired ratio as well.

The apparent first pitch in the barrier pattern 23 is calculated on the basis of the product of the actual first pitch in the barrier pattern 23 and the first enlargement factor set for the optical system 30, and, the apparent second pitch in the barrier pattern 23 is calculated on the basis of the product of the actual second pitch in the barrier pattern 23 and the second enlargement factor set for the optical system 30. The apparent pitch in the X-axis direction of the subpixel 11 is calculated on the basis of the product of the actual pitch in the X-axis direction of the subpixel 11 and the first enlargement factor set for the optical system 30, and, the apparent pitch in the Y-axis direction of the subpixel 11 is calculated on the basis of the product of the actual pitch in the Y-axis direction of the subpixel 11 and the second enlargement factor set for the optical system 30. That is, both the barrier pattern 23 and the subpixel 11 appear to be enlarged by the same enlargement factor by the optical system 30. In this case, the left-eye visible region 13L and the right-eye visible region 13R appear to be enlarged identically or similarly to the apparent subpixel 11. The number of the first subpixels contained in the left-eye visible region 13L and the number of the second subpixels contained in the right-eye visible region 13R can be maintained. Each of the left-eye visible region 13L and the right-eye visible region 13R can be enlarged as viewed in the X-axis direction, with the number of the first subpixels aligned in the X-axis direction in the left-eye visible region 13L and the number of the second subpixels aligned in the X-axis direction in the right-eye visible region 13R maintained. Maintaining the number of the first subpixels and the number of the second subpixels ensures that the number of repetitions of the left-eye image and the right-eye image contained in the parallax image can be maintained. As a result, the display device 10 may display the same content regardless of the optical system 30, and the display content can be easily controlled.

A display panel for general purpose use has a display region with a 16:9 aspect ratio or a 4:3 aspect ratio, for example. In the device according to the comparative example, the display panel includes a landscape display region, as an actual display region, which is greater in lateral elongation than the landscape display region of the general-purpose display panel. Given that the first enlargement factor and the second enlargement factor are equal in the optical system 30, the display panel including a landscape display region greater in lateral elongation than the landscape display region of the general-purpose display panel allows projection of a laterally long parallax image to user's eyes. On the other hand, a display panel including a display region with an aspect ratio which differs from the aspect ratio of the general-purpose display panel is more costly than the general-purpose display panel. The head-up display 1 according to the embodiment achieves cost reduction by utilizing a general-purpose display panel and yet can provide users with higher-quality stereoscopic vision based on laterally long parallax images. In other words, the head-up display 1 according to the embodiment is capable of providing stereoscopic vision based on laterally long parallax images to users without the necessity of changing of the display panel.

On viewing the display device 10 and the barrier 2 with user's eyes through the optical system 30, the user may see the display device 10 and the barrier 2 apparently distorted due to the characteristics of the optical system 30. For example, in some cases, the outer edges and nearby areas of the display device 10 and the barrier 2 appear to be greatly distorted. Thus, the shape of the barrier pattern 23 is preferably determined based on the distortion of the optical system 30.

The periodic arrangement of the left-eye visible regions 13L and the right-eye visible regions 13R of the display device 10 in the first direction allows projection of a parallax image to user's eyes. The periodicity of the arrangement of the left-eye visible regions 13L and the right-eye visible regions 13R becomes lost at the end of the display device 10. A certain boundary condition can be set at the end and nearby areas of the display device 10. That is, the arrangement of the left-eye visible regions 13L and the right-eye visible regions 13R may be determined in accordance with the certain boundary condition at the end and nearby areas of the display device 10.

The head-up display 1 according to the embodiment is mountable in a mobile object. Some constituent components of the head-up display 1 can be prepared by the shared use of some devices or components of the mobile object. For example, a windshield of the mobile object may serve also as a constituent component of the head-up display 1. For example, the optical member 30c shown in FIG. 1 may be replaced with the windshield of the mobile object. The head-up display 1 may project a parallax image while enlarging it in the lateral direction in conformance with the laterally elongated shape of the windshield in user's sight.

The term "mobile object" as used in the disclosure includes vehicles, ships, and aircrafts. In the disclosure, the "vehicles" include motor vehicles and industrial vehicles, but are not limited to them, and may also include railroad vehicles, domestic vehicles, and fixed-wing airplanes that run on runways. The "motor vehicles" include passenger automobiles, trucks, buses, motorcycles, and trolleybuses, but are not limited to them, and may also include other vehicles that run on roads. The "industrial vehicles" include industrial vehicles for agriculture and those for construction work. More specifically, the "industrial vehicles" include forklifts and golf carts, but are not limited to them. The "industrial vehicles for agriculture" include tractors, cultivators, transplanters, binders, combines, and lawn mowers, but are not limited to them. The "industrial vehicles for construction work" include bulldozers, scrapers, loading shovels, crane vehicles, dump trucks, and road rollers, but are not limited to them. The "vehicles" also include human-powered vehicles. How to categorize vehicles is not limited to the foregoing manner. For example, the "motor vehicles" may include industrial vehicle that can run on roads, and, one and the same vehicle may be put in categories. In the disclosure, the "ships" include personal watercrafts, boats, and tankers. In the disclosure, the "aircrafts" include fixed-wing airplanes and rotary-wing airplanes.

The constructions according to the disclosure are not limited to the embodiments described heretofore, and, various modifications and changes may be made. For example, the features such as functions of the constituent components can be rearranged without causing logical inconsistencies. Moreover, for example, constituent components may be assembled into one, or a single component may be divided into pieces.

The drawings for explaining the constructions according to the disclosure are schematic representations. Thus, the dimensional ratios, etc. in the drawings do not necessarily coincide with actual dimensional ratios, etc.

The terms such as "first" and "second" as used in the disclosure are identifiers used merely to draw a distinction between the constituent components. In the disclosure, the components distinguished from each other by the identifiers such as "first" and "second" may have their identifiers interchanged with each other. For example, the first subpixel and the second subpixel may have their identifiers, namely "first" and "second", interchanged with each other. The identifiers are interchanged concurrently. The components are distinguishable even after the interchange of their identifiers. The identifiers may be omitted. In the case of omitting the identifiers, the components are distinguished from each other by reference symbols. The description of identifiers such as "first" and "second" in the disclosure shall not be used alone for the interpretation of the order of the components or for the reasoning of the presence of a lesser identifier.

REFERENCE SIGNS LIST

1: Head-up display
5L: Left eye
5R: Right eye
10: display device
10Q: Virtual image from display device
11: Subpixel
11L: First region
11R: Second region
12: Pixel
13L: Left-eye visible region
13R: Right-eye visible region
14L: Left-eye dimmed region
14R: Right-eye dimmed region
15: Display boundary
20: Barrier
21: Light-transmitting region
22: Light-diminishing region
23: Barrier pattern
30: Optical system
30a, 30b, 30c: Optical member
32: Optical path

The invention claimed is:

1. A head-up display, comprising:
a display panel configured to emit image light corresponding to a parallax image, the parallax image comprising a left-eye image and a right-eye image;
a barrier comprising barrier patterns, which can operate to allow the image light corresponding to the left-eye image to reach user's left eye, as well as to allow the image light corresponding to the right-eye image to reach user's right eye; and
an optical system configured to
carry out focusing of the image light corresponding to the parallax image, and to project a resulting parallax image to user's left and right eyes, and carry out focusing of the image light corresponding to the parallax image on a projection plane so that the parallax image and the barrier patterns on the projection plane are enlarged in a first direction corresponding with a parallax direction by a first enlargement factor, and the parallax image is enlarged in a second direction intersecting with the first direction by a second enlargement factor, the first enlargement factor and the second enlargement factor being different from each other, wherein the barrier patterns are arranged in the first direction, and each extend in a direction inclined at a certain angle with respect to the second direction, and the certain angle is determined based on a ratio between the first enlargement factor and the second enlargement factor, and an angle at which the barrier patterns are inclined with respect to the second direction when viewed on the projection plane.

2. The head-up display according to claim 1, wherein the barrier patterns are arranged in the first direction at certain pitches, and the certain pitches are determined based on the ratio between the first enlargement factor and the second enlargement factor, and pitches of the barrier patterns when viewed on the projection plane.

3. The head-up display according to claim 1, wherein the display panel comprises first subpixels for displaying the left-eye image and second subpixels for displaying the right-eye image, and the optical system enlarges the parallax image, with a number of the first subpixels arranged in the first direction and a number of the second subpixels arranged in the first direction maintained.

4. A mobile object comprising a head-up display comprising a display panel, a barrier, and an optical system, the display panel being configured to emit image light corresponding to a parallax image comprising a left-eye image and a right-eye image, the barrier comprising barrier patterns which can operate to allow image light corresponding to the left-eye image to reach user's left eye, as well as to allow image light corresponding to the right-eye image to reach user's right eye, the optical system being configured to carry out focusing of the image light corresponding to the parallax image on a projection plane so that the parallax image and the barrier patterns on the projection plane are enlarged in a first direction corresponding with a parallax direction by a first enlargement factor and the parallax image is enlarged in a second direction intersecting with the first direction by a second enlargement factor, and project the parallax image to user's left and right eyes, the first enlargement factor and the second enlargement factor being different from each other, wherein the barrier patterns are arranged in the first direction, and each extend in a direction inclined at a certain angle with respect to the second direction, and the certain angle is determined based on a ratio between the first enlargement factor and the second enlargement factor, and an angle at which the barrier patterns are inclined with respect to the second direction when viewed on the projection plane.

5. The mobile object according to claim 4, wherein the barrier patterns are arranged in the first direction at certain pitches, and the certain pitches are determined based on the ratio between the first enlargement factor and the second enlargement factor, and pitches of the barrier patterns when viewed on the projection plane.

6. The mobile object according to claim 4, wherein the display panel comprises first subpixels for displaying the left-eye image and second subpixels for displaying the right-eye image, and the optical system enlarges the parallax image, with a number of the first subpixels arranged in the first direction and a number of the second subpixels arranged in the first direction maintained.

7. A head-up display, comprising:

a display panel configured to emit image light corresponding to a parallax image, the parallax image comprising a left-eye image and a right-eye image;

a barrier comprising barrier patterns, which can operate to allow the image light corresponding to the left-eye image to reach user's left eye, as well as to allow the image light corresponding to the right-eye image to reach user's right eye; and an optical system configured to carry out focusing of the image light corresponding to the parallax image, and to project a resulting parallax image to user's left and right eyes, and carry out focusing of the image light corresponding to the parallax image on a projection plane so that the parallax image and the barrier patterns on the projection plane are enlarged in a first direction corresponding with a parallax direction by a first enlargement factor, and the parallax image is enlarged in a second direction intersecting with the first direction by a second enlargement factor, the first enlargement factor and the second enlargement factor being different from each other, wherein the barrier patterns are arranged in the first direction at certain pitches, and the certain pitches are determined based on a ratio between the first enlargement factor and the second enlargement factor, and pitches of the barrier patterns when viewed on the projection plane.

8. The head-up display according to claim 7, wherein the display panel comprises first subpixels for displaying the left-eye image and second subpixels for displaying the right-eye image, and the optical system enlarges the parallax image, with a number of the first subpixels arranged in the first direction and a number of the second subpixels arranged in the first direction maintained.

9. A mobile object comprising a head-up display comprising a display panel, a barrier, and an optical system, the display panel being configured to emit image light corresponding to a parallax image comprising a left-eye image and a right-eye image, the barrier comprising barrier patterns which can operate to allow image light corresponding to the left-eye image to reach user's left eye, as well as to allow image light corresponding to the right-eye image to reach user's right eye, the optical system being configured to carry out focusing of the image light corresponding to the parallax image on a projection plane so that the parallax image and the barrier patterns on the projection plane are enlarged in a first direction corresponding with a parallax direction by a first enlargement factor and the parallax image is enlarged in a second direction intersecting with the first direction by a second enlargement factor, and project the parallax image to user's left and right eyes, the first enlargement factor and the second enlargement factor being different from each other, wherein the barrier patterns are arranged in the first direction at certain pitches, and the certain pitches are determined based on a ratio between the first enlargement factor and the second enlargement factor, and pitches of the barrier patterns when viewed on the projection plane.

10. The mobile object according to claim 9, wherein the display panel comprises first subpixels for displaying the left-eye image and second subpixels for displaying the right-eye image, and the optical system enlarges the parallax image, with a number of the first subpixels arranged in the first direction and a number of the second subpixels arranged in the first direction maintained.

* * * * *